United States Patent [19]

Shimizu et al.

[11] 4,202,965
[45] May 13, 1980

[54] METHOD FOR ISOLATING SOLID POLYARYLENE ESTER FROM ITS ORGANIC SOLVENT SOLUTION

[75] Inventors: Senzo Shimizu, Odawara; Isao Nomura; Masahiro Harada, both of Hiratsuka, all of Japan

[73] Assignee: Mitsubishi Gas Chemical Company, Inc., Tokyo, Japan

[21] Appl. No.: 945,068

[22] Filed: Sep. 22, 1978

[30] Foreign Application Priority Data

Sep. 26, 1977 [JP] Japan ............................... 52-115376

[51] Int. Cl.$^2$ ...................... C08G 63/72; C08G 63/74
[52] U.S. Cl. ...................... 528/499; 528/128; 528/173; 528/176; 528/179; 528/190; 528/191; 528/194
[58] Field of Search ............... 528/499, 176, 179, 128, 528/173, 190, 191, 194

[56] References Cited
U.S. PATENT DOCUMENTS 3,933,713   1/1976   Sokolov et al. ..................... 528/179

*Primary Examiner*—Lester L. Lee
*Attorney, Agent, or Firm*—Wenderoth, Lind & Ponack

[57] ABSTRACT

A method for isolating a polyarylene ester from a solution of the polyarylene ester in tetrahydrofuran and/or dioxane which is prepared by polycondensing a dihydric phenol compound and an aromatic dicarboxylic acid or its derivative, which comprises adding water to the solvent solution to form a water-containing solution, the weight ratio of water to the solvent solution being from 0.01 to 0.5, subjecting the resulting water-containing solution to an aging treatment, then precipitating substantially all of the polyarylene ester as a particulate solid from the water-containing solution, and separating the precipitated polyarylene ester from the water-containing solution.

10 Claims, No Drawings

METHOD FOR ISOLATING SOLID POLYARYLENE ESTER FROM ITS ORGANIC SOLVENT SOLUTION

BACKGROUND OF THE INVENTION

This invention relates to a method for isolating a polyarylene ester from its solution in an organic solvent. More specifically, the invention relates to a method for isolating a polyarylene ester as a particulate solid having a high bulk density and a uniform particle size from a solution of the polyarylene ester in tetrahydrofuran and/or dioxane which is obtained by polycondensing dihydric phenol compound with an aromatic dicarboxylic acid or its derivative.

Polyarylene esters obtained from aromatic dicarboxylic acids or derivatives thereof such as dicarboxylic acid dichlorides and dihydric phenol compounds are polymers having good thermal stability and fire retardency and superior mechanical and other properties. These polymers are produced by various known methods such as interfacial polycondensation, solution polycondensation and melt polycondensation.

In particular, the interfacial polycondensation has generally gained acceptance as an advantageous commercial process because it gives polymers of high degrees of polymerization at low temperatures. The conventional interfacial polycondensation technique for the production of polyarylene ester utilizes the interface between water and a water-insoluble organic solvent such as dichloromethane, dichloroethane, xylene or toluene in performing the polycondensation reaction. The resulting polymer is obtained as a solution in the water-insoluble organic solvent. Isolation of the desired polymer from the reaction mixture is generally effected by a procedure which involves first separating the reaction mixture into a polymer solution layer and an aqueous layer, subjecting the polymer solution layer to a purification treatment to remove impurities present in it (such as a sodium salt of unreacted dihydric phenol compound and NaCl formed as a by-product by the reaction) to the greatest possible extent, and then separating the polymer from the purified polymer solution. The purification treatment of the polymer solution is usually carried out by repeating a procedure of washing the polymer solution with a large quantity of an alkaline or acidic aqueous solution or water and then separating the organic layer from the aqueous layer. Isolation of the polymer from the purified polymer solution is effected usually by concentrating the polymer solution to gel the polymer, or by contacting the polymer solution with a large quantity of a poor solvent for the polymer, such as acetone or methanol, to precipitate the polymer and then separating it by filtration.

Thus, in the interfacial polycondensation method in which a water-immiscible organic solvent is used, the polymer solution must be purified before isolating the polymer from it, and it is a serious disadvantage of this method. The reaction between the aromatic dicarboxylic acid dichloride and the dihydric phenol compound occurs at the interface between the organic solvent layer and the aqueous layer. After the reaction, when the organic solvent layer is separated from the aqueous layer, a small amount of the aqueous layer containing impurities remains in the organic solvent layer without being completely separated from it. When the solution of the polymer in the organic solvent is directly subjected to an operation of isolating the polymer without prior purification, the polymer will be contaminated by the impurities, and decrease in purity, and consequently, its heat resistance is not satisfactory. Accordingly, the purification treatment of the polymer solution cannot be omitted. The washing operation and the operation of separating the organic layer from the aqueous layer in this purification treatment are complicated, and it is very disadvantageous in commercial operations to repeat such a complicated procedure.

In addition to this disadvantage, the prior art interfacial polycondensation method suffers from other industrially serious defects. For example, the isolation of the polymer is complicated, or the recovery of poor solvents such as methanol and acetone, and reaction solvents such as dichloromethane and dichloroethane is inefficient.

In an attempt to remove these defects of the interfacial polycondensation method for producing polyarylene esters, an interfacial polycondensation method using an organic solvent which is partially or completely miscible with water as a reaction solvent was suggested, for example, in Japanese Laid-Open Patent Publications Nos. 21498/74 and 38388/76. According to the methods disclosed in these prior art references, a solution of an aromatic dicarboxylic acid dichloride in tetrahydrofuran or dioxane, a solution of a dihydric phenol compound in tetrahydrofuran or dioxane, and an aqueous solution containing an alkali metal hydroxide, and/or an alkaline earth metal hydroxide and an inorganic electrolyte such as sodium chloride are contacted with one another to perform a polycondensation reaction. When the reaction is over, the polymer is in the form dissolved in tetrahydrofuran or dioxane, and an emulsion consisting of this solution and an aqueous layer containing the inorganic electrolyte is formed. The emulsion is poured into a large quantity of water to precipitate the polymer, and the precipitated polymer is separated by filtration to separate it as a powder. According to this method, washing of the separated solid powder with water is sufficient for the purification of the polymer, and it is not necessary to purify the polymer while it is still in the form of a solution. Hence, this method is regarded as very advantageous over the aforesaid interfacial polycondensation method using a water-immiscible organic solvent.

This method, however, still has some defects. For example, the resulting polymer in the form of a fine particulate solid does not necessarily have a uniform particle size and a high bulk density, and it is difficult to obtain a polymer substantially free from impurities such as inorganic salts only by washing with water. In particular, since the organic solvent solution of the polymer is poured into a large amount of water, the water-miscible reaction solvent becomes a large amount of a dilute aqueous solution, and it is by no means easy to recover the reaction solvent from this dilute aqueous solution. The solvent recovering operation is very troublesome, and is also inefficient from the viewpoint of energy. This is a serious defects of this method from a commercial standpoint.

In view of the fact that while the interfacial polycondensation method using a water-miscible organic solvent such as tetrahydrofuran or dioxane has been considered as advantageous for the production of polyarylene esters, it still suffers from a serious defect in isolating the resulting polymer, the present inventors have worked extensibely, and discovered a unique phenomenon which a solution of a polyarylene ester in tetrahydrofuran and/or dioxane exhibits. This discovery finally led to the accomplishment of the present invention.

It is an object of this invention to provide a method for recovering a polyarylene ester as a solid by a simple and convenient procedure from a solution of the polyarylene ester in a water-miscible organic solvent.

Another object of the invention is to isolate a polyarylene ester as a particulate solid having a high bulk density and a uniform particle size from its solution.

Still another object of this invention is to recover the reaction solvent easily from the water-containing solution remaining after separation of the polyarylene ester, and thus to remedy the greatest defect of the method for producing polyarylene esters by interfacial polycondensation using a water-miscible organic solvent as a reaction medium.

SUMMARY OF THE INVENTION

The present invention provides a method for isolating a polyarylene ester from a solution of the polyarylene ester in tetrahydrofuran and/or dioxane which is prepared by polycondensing a dihydric phenol compound and an aromatic dicarboxylic acid or its derivative, which comprises adding water to the solvent solution to form a water-containing solution, the weight ratio of water to the solvent solution being from 0.01 to 0.5, subjecting the resulting water-containing solution to an aging treatment, then precipitating substantially all of the polyarylene ester as a particulate solid from the water-containing solution, and separating the precipitated polyarylene ester from the aqueous solution.

DETAILED DESCRIPTION OF THE INVENTION

The present inventors have found that a solution of a polyarylene ester in tetrahydrofuran and/or dioxane shows the unique phenomenon that when a relatively small amount, i.e. 0.01 to 0.5 part by weight per part by weight of the solution, of water is added to the solution and the mixture is allowed to stand, the state of dissolution of the polyarylene ester in the solution changes with time, and therefore, by simply stirring the solution or allowing it to stand, the polyarylene ester precipitates. This phenomenon is surprising as it cannot at all be predicted from the behavior of an ordinary polymer solution. Such a phenomenon is not seen in general polymer solutions.

Accordingly, the present invention provides a novel isolation method based on the utilization of the unique phenomenon discovered by the present inventors, which by the addition of a far smaller amount of water than in conventional methods, enables a polyarylene ester to be isolated as a particulate solid having desirable properties such a high bulk density and a uniform particle size.

One specific procedure for performing the method of this invention is described below.

When water is added successively with stirring to a solution of a polyarylene ester in tetrahydrofuran and/or dioxane, and the amount of water reaches a certain limit, the solution becomes whitishly turbid. The amount of water in which the solution begins to become turbid is referred to in the present application as "the critical amount". Water is added to the solution in an amount equal to, or larger than, the critical amount to render the solution whitishly turbid. Then, the addition of water and the stirring of the solution are stopped, and the solution is allowed to stand. This results in the separation of the solution into a layer containing the polymer and a layer not containing it. As the time elapses, the lower, polymer-containing layer gradually solidifies until at last the entire layer solidifies to an agar-like mass. When the polymer-containing layer that has solidified to an agar-like mass is stirred or shaken, the agar-like mass is easily destroyed, and substantially all of the polyarylene ester precipitates as a particulate solid having a high bulk density and a uniform particle size. The precipitated polyarylene ester is separated from the solution by a suitable operation such as centrifugal separation or filtration.

In the aforesaid procedure, the amount of water required is generally equal to, or larger than, the critical amount. Addition of water in an amount larger than 0.5 part by weight per part by weight of the solution should be avoided because it is liable to cause the precipitation of polyarylene ester particles which have a non-uniform particle size and partly contain particles with a large diameter. Particles having a non-uniform particle size reduce the efficiency of the filtration or other separating operation, and the efficiency of washing the particulate polyarylene ester after solidification, and consequently adversely affect the thermal stability and mechanical properties of the polyarylene ester.

In an alternative mode, the method of this invention can be practised as follows:

Water in an amount equal to, or larger than, the critical amount is added with stirring to a solution of a polyarylene ester in tetrahydrofuran and/or dioxane to render the solution whitishly turbid. If the addition of water is stopped but the stirring of the solution is continued, the solution does not separate into two layers. But instead, the turbidity of the solution gradually increases and finally, substantially all of the polyarylene ester precipitates as a particulate solid having a high bulk density and a uniform particle size. The polyarylene ester is then separated from the solution by a suitable method such as centrifugal separation or filtration.

In this mode of practice, too, the amount of water added should be limited to not more than 0.5 part by weight per part by weight of the solution for the same reason as stated hereinabove. However, in this mode of practice, it is not always necessary for the amount of water to be equal to or more than the critical amount, and even when the amount of water is less than the critical amount, the isolation of the polyarylene ester in accordance with this invention can be performed. When water is added in an amount of less than the critical amount and then the addition of water is stopped, the solution does not become turbid, but on standing with or without stirring, the solution soon becomes whitishly turbid. On further standing with or without stirring, the turbidity of the solution gradually increases as stated hereinabove, and soon, the precipitation of the polyarylene ester begins until substantially all of the polyarylene ester precipitates as a particulate solid having a high bulk density and a uniform particle size. Thus, if desired, the amount of water can be decreased to below the critical amount. Addition of water in an amount of less than 0.01 part by weight per part by weight of the solution should, however, be avoided because it will much prolong the time required until the precipitation of the polyarylene ester begins, and drastically reduce the working efficiency.

As stated hereinabove, the method of this invention is characterized by adding a relatively small amount (i.e., in a water-to-solution weight ratio of from 0.01 to 0.5, preferably from 0.03 to 0.3) of water to a solution of a polyarylene ester in tetrahydrofuran and/or dioxane, allowing the resulting water-containing solution to stand with or without stirring, and then precipitating substantially all of the polyarylene ester as a particulate solid having a high bulk density and a uniform particle size by simply stirring the solution.

In the present application, the operation of allowing the aqueous solution to stand at room temperature and atmospheric pressure with or without stirring is referred to as "aging treatment". Although we do not intend to restrict the invention by any theory, we theorize that this aging treatment causes a change in the state of dissolution of the polyarylene ester in the solution and the solution takes a state in which the polyarylene ester can be readily precipitated, and that this change in the state of dissolution is due to the gathering and coagulation of the molecules of polyarylene ester which are dissolved in the solution.

In order that the state of dissolution of the polyarylene ester may be changed by the aging treatment, it is necessary to add a specified small amount of water to a solution of the polyarylene ester in tetrahydrofuran and/or dioxane. If the solution does not contain water, the aging treatment cannot lead to the precipitation of the polyarylene ester.

The suitable concentration of the polyarylene ester in the organic solvent solution is usually from 3 to 30% by weight, preferably from 5 to 20% by weight.

It is preferred that the amount of water to be added to the organic solvent solution be more than the critical amount. The critical amount varies depending upon various factors such as the concentration of the polyarylene ester in the solution, the molecular weight of the polyarylene ester of the type of the solvent.

Water may be added in a multiple of stage, and for example, water may be added further after the beginning of the precipitation of the polyarylene ester. When the organic solvent solution already contains some water, the amount of such water should be included in the amount of water specified in this invention. In other words, the total amount of the water contained in the organic solvent solution before the application of the method of this invention and the water newly added should be within the range of 0.01 to 0.5 part by weight per part by weight of the organic solvent solution.

The aging treatment needs to be carried out at least until substantially all of the polyarylene ester precipitates. The minimum aging treatment time required for this purpose varies depending upon various factors such as the concentration of the polyarylene ester in the organic solvent, the molecular weight of the polyarylene ester, the type of the solvent, the amount of water added, and the degree of stirring efficiency, and is difficult to determine definitely. Those skilled in the art, however, can determine it easily by experiment. The aging treatment may be continued after substantially all of the polyarylene ester has precipitated, and this is generally preferred. It is especially preferred that after substantially all of the polyarylene ester has precipitated, a small amount of water be added and the aging treatment be continued with stirring. This increases the hardness of the precipitated polyarylene ester particles and facilitates filtration and other separating operation. This operation is referred to as "post aging treatment". However, this post aging treatment is not essential, and the amount of water added in performing the post aging treatment should be excluded from the amount of water specified in this invention (i.e., 0.01 to 0.5 part by weight per part by weight of the organic solvent solution).

According to the method of this invention, a polyarylene ester can be recovered as a solid from a solution of the polyarylene ester in tetrahydrofuran and/or dioxane, and the resulting solid is particulate with a uniform particle size. Impurities can therefore be removed only by washing the solid. The solid polymer had good thermal stability and resistance to hydrolysis and superior mechanical properties. Furthermore, the particulate solid of polyarylene ester, after drying, can be directly fed to an extruder to be converted into pellets without going through a pulverizing step and/or a screening step. This offers another practical advantage.

Since the resulting particulate polyarylene ester has a high bulk density, it has the advantage that the required space can be saved in a molding and other operations. An especially advantageous feature of the invention is that by adding a far smaller amount of water than in conventional methods, substantially all of the polyarylene ester can be recovered. Since the solution remaining after separation of the polyarylene ester contains only a small amount of water, the reaction solvent can be recovered easily and economically. Accordingly, the method of this invention is very advantageous in commercial practice.

The polymer solution to which the method of this invention can be applied includes not only the organic solvent solution separated from an emulsion which is obtained by contacting a solution of an aromatic dicarboxylic acid dichloride and a dihydric phenol compound in tetrahydrofuran and/or dioxane with an aqueous solution containing an alkali metal or alkaline earth metal hydroxide and an inorganic electrolyte to perform polycondensation, but also solutions prepared by dissolving polyarylene esters obtained by other various polycondensation methods in tetrahydrofuran and/or dioxane.

The polyarylene ester to which the method of this invention is applied is synthesized from a dihydric phenol compound and an aromatic dicarboxylic acid or its derivative. Specifically, the dihydric phenol compound is expressed by the following general formula

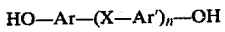

HO—Ar—(X—Ar')$_n$—OH wherein Ar and Ar' represent an arylene group selected from the class consisting of phenylene and naphthylene, X represents a bridging member selected from the class consisting of a direct single bond, a methylene group, an alkylidene group with 2 to 5 carbon atoms, an ether group, a carbonyl group, a sulfite group, a sulfoxide group and a sulfonyl group, and n represents 0 or 1.

Suitable dihydric phenol compounds of the above general formula include, for example, bis(4-hydroxyphenyl) methane, bis(4-hydroxy-3-methylphenyl)methane, bis(4-hydroxy-3,5-dichlorophenyl)methane, bis(4-hydroxyphenyl)ketone, bis(4-hydroxyphenyl)sulfite, bis(4-hydroxyphenyl)sulfone, 4,4'-dihydroxydiphenyl ether, 2,2-bis(4-hydroxyphenyl)propane, 2,2-bis(4-hydroxy-3,5-dichlorophenyl)propane, 2,2-bis(4-hydroxynaphthyl)propane, hydroquinone, and 4,4'-dihydroxybiphenyl. Phenolphthalein can also be used as the dihydric phenol compound.

These compounds can be used as a mixture. An especially preferred dihydric phenol compound is 2,2-bis(4-hydroxyphenyl)propane.

The aromatic dicarboxylic acid is expressed by the following general formula

HOOC—Ar″—COOH wherein Ar″ represents an arylene group such as an o-phenylene, m-phenylene, p-phenylene or naphthylene group, which may be substituted with an alkyl group having 1 to 3 carbon atoms, or a halogen atom.

Specifically, the aromatic dicarboxylic acid denotes phthalic acid, terephthalic acid, isophthalic acid, and naphthalene dicarboxylic acid. The reactive derivatives of these aromatic dicarboxylic acids can also be used. The derivatives of the aromatic dicarboxylic acids are the dichlorides or diesters such as alkyl esters with 1 to 3 carbon atoms or phenyl esters of these aromatic dicarboxylic acids. Examples of the derivatives of the aromatic dicarboxylic acids are terephthaloyl dichloride, isophthaloyl dichloride, phthaloyl dichloride, diphenyl terephthalate, diphenyl isophthalate, diphenyl phthalate, dimethyl isophthalate, dimethyl terephthalate, and dimethylphthalate. Terephthaloyl dichloride and isophthaloyl dichloride are especially preferred among the aromatic dicarboxylic acids or derivatives thereof used in this invention.

The following examples illustrate the present invention more specifically. In these examples, the logarithmic viscosity of polymer is calculated in accordance with the following equation.

$$\eta_{inh} = ln\{t_1/t_0\}/c$$

$t_1$: the same in seconds required for a solution of polymer in chloroform to fall,
$t_0$: the time in seconds required for chloroform to fall,
C: the amount of polymer per 100 ml of the polymer solution (measured in a concentration of 1.0 g/100 ml).

Referential Example 1

A flask equipped with a stirrer, a reflux condenser, a dropping funnel, a nitrogen introducing tube and a thermometer was charged with 22.85 g (0.100 mole) of sufficiently purified 2,2-bis(4-hydroxyphenyl)propane and 220 ml of tetrahydrofuran to form a solution. To the solution were added 36 g of sodium chloride, 9.0 g of sodium hydroxide and 180 ml of water. Then, a solution of 10.33 g (0.051 mole) of terephthaloyl dichloride, and 10.33 g (0.051 mole) of isophthaloyl dichloride in 220 ml of dry tetrahydrofuran was poured into the flask with vigorous stirring. The reaction ended in about 5 minutes. After the reaction, the resulting mixture was neutralized with a 0.1 N aqueous solution of phosphoric acid, and the aqueous phase was removed. Thus, an organic solvent solution consisting mainly of polyarylene ester and tetrahydrofuran was recovered. The resulting organic solvent solution contained about 9.2% by weight of the polyarylene ester.

With stirring, the organic solution was put into a large amount of water, and the precipitated solid was separated by filtration to afford polyarylene ester as a powder having a logarithmic viscosity of 0.61. The powdery polyarylene ester had a low bulk density and a non-uniform particle size, and contained large particles. Thus, a considerable time was consumed in separating the polymer by filtration.

Referential Example 2

A separable flask equipped with a stirrer, a reflux condenser, a dropping funnel, a nitrogen introducing tube and a thermometer was charged with 22.83 g (0.100 mole) of 2,2-bis(4-hydroxyphenyl)propane, 0.384 g (0.0041 mole) of phenol, 8.57 g (0.214 mole) of sodium hydroxide and 136.1 ml of water, and they were uniformly dissolved. To the solution were added 68 ml of dichloromethane and 0.068 g of benzyl trimethyl ammonium chloride, and the mixture was stirred. Then, a solution of 10.36 g (0.051 mole) each of isophthaloyl dichloride and terephthaloyl dichloride in 68 ml of dichloromethane was added dropwise, and the reaction was performed at 25° C. for 4 hours, and the dichloromethane solution of the polymer was separated from the aqueous layer. The polymer solution was washed fully with water, and put into a large quantity of vigorously stirred methanol. The precipitated solid was separated by filtration to afford polyarylene ester having a logarithmic viscosity of 0.63 as a powder. The powdery polyarylene ester had a low bulk density and a non-uniform particle size, and contained large particles. Hence, a considerable time was required for separation by filtration.

EXAMPLE 1

To 200 ml of the tetrahydrofuran solution of polyarylene ester obtained in Referential Example 1 was added 8 ml of water over the course of about 1 minute with stirring. The solution was seen to be turbid. The addition of water was stopped at this point, and the stirring was also stopped. When the solution was allowed to stand, it separated into two layers, and the polymer-containing layer at the bottom began to solidify gradually to an agar-like mass. After standing for about 60 minutes, the polymer-containing layer solidified entirely to an agar-like mass. When the stirring was resumed, the agar-like polymer-containing layer was easily destroyed, and the polymer immediately dispersed as a fine powder in the solution. Substantially all of the polymer precipitated as fine particles. Furthermore, 22 ml of water was added over the course of 2 minutes with stirring, and the stirring was continued for about 10 minutes. The polyarylene ester precipitated was separated from the solution by filtration. The filtration could be performed very easily. The resulting particulate polyarylene ester was hard and had a high bulk density and a uniform particle size. Its logarithmic viscosity was 0.61.

EXAMPLE 2

Four grams of water was gradually added with stirring over about 30 seconds to 100 g of the tetrahydrofuran solution of polyarylene ester obtained in Referential Example 1. The polymer solution was seen to be turbid whitishly. When at this time, the addition of water and the stirring of the solution were both stopped, the solution separated into two layers as was observed in Example 1. However, in this Example, only the addition of water was stopped, and the stirring was continued. In about 40 minutes, the turbidity of the solution increased considerably, and a particulate polymer began to precipitate. Furthermore, 6 g of water was added over about 1 minute with stirring, and the stirring was continued. In about 10 minutes, substantially all of the particulate polyarylene ester uniformly dispersed in the solution. The resulting dispersion was filtered to afford a particulate polyarylene ester having a high bulk density and a uniform particle size. The resulting particulate polyarylene ester was washed with 50 g of water, and then dried at 70° C. for 7 hours. The resulting polyarylene ester had a logarithmic viscosity of 0.61, and the amount of the polymer yielded was 9.1 g (98.7%).

It was also found that from the recovered solution remaining after the selaration of the polyarylene ester, tetrahydrofuran can be easily and almost quantitatively recovered by fractional distillation.

EXAMPLE 3

A 10% tetrahydrofuran solution of the polyarylene ester synthesized in Referential Example 2 was prepared. To 200 ml of this solution was added 16 ml of water with stirring over the course of about 2 minutes. The solution was seen to become turbid whitishly. When the addition of water and the stirring were stopped at this point and the solution was allowed to stand, the solution separated into two layers. The polymer-containing layer at the bottom began to solidify gradually to an agar-like mass. After standing for about 60 minutes, the entire polymer-containing layer solidified to an agar-like mass. When the stirring was resumed at this time, the agar-like polymer-containing layer was easily destroyed, and a fine particulate polymer immediately dispersed in the solution. Thus, a dispersion in which substantially all of the polymer was dispersed as fine particles was obtained. The dispersion was stirred further for 10 minutes, and the polyarylene ester was separated from the solution by filtration. The filtration could be performed very easily. The resulting polyarylene ester had a high bulk density and a uniform particle size, and its logarithmic viscosity was 0.65.

Comparative Example

To the 10% solution of polyarylene ester used in Example 3 was gradually added 1.6 ml (0.009 part by weight per part by weight of the solution) of water instead of 16 ml of water. At this time, no turbidity of the solution was recognized. The addition of water and the stirring of the solution were both stopped, and the solution was allowed to stand. The solution did not separate into two layers, and it was not until about 30 hours after the standing that the solution was seen to be whitishly turbid. A period of as long as about 40 hours after standing was required for the separation of a particulate polymer.

EXAMPLE 4

A 10% solution of polyarylene ester was prepared by using the tetrahydrofuran solution of the polyarylene ester obtained in Referential Example 1. With stirring, 16 ml of water was added gradually to 200 ml of this solution over the course of about 2 minutes with stirring. The solution was seen to be whitishly turbid. Subsequently, the solution was vigorously stirred for about 60 minutes, when the turbidity of the solution considerably increased and a particulate polymer began to precipitate. On further stirring, a dispersion was obtained in about 10 minutes in which substantially all of the polyarylene ester was uniformly dispersed as a homogeneous particulate solid in the solvent. Filtration of the dispersion afforded a particulate polyarylene ester having a high bulk density and a uniform particle size. The resulting particulate polyarylene ester had a logarithmic viscosity of 0.61.

EXAMPLE 5

The solid polyarylene ester obtained in Referential Example 2 was dissolved in 1,4-dioxane to form a 12% solution. To 200 ml of the solution was gradually added 16 ml of water over the course of about 2 minutes. The solution was seen to become turbid. At this time, the addition of water and the stirring of the solution were stopped. The solution separated into two layers, and the polyarylene ester gathered in the dioxane solution in the lower layer. The polymer-containing layer gradually solidified, and on standing for about 10 hours, it solidified to an agar-like mass. When the stirring was resumed, the agar-like layer was easily destroyed, and substantially all of the polyarylene ester precipitated as a particulate solid having a high bulk density and a uniform particle size.

EXAMPLE 6

The tetrahydrofuran solution of polyarylene ester obtained in Referential Example 1 was concentrated to form a solution with a polymer concentration of 15%. To 200 ml of the solution was gradually added 8 ml of water over the course of about 1 minute. The solution was seen to become whitishly turbid. At this time, the addition of water and the stirring of the solution were stopped, and the solution was allowed to stand. The solution separated into two layers, and the polymer-containing layer at the bottom began to solidify gradually to an agar-like mass. After standing for 45 minutes, the entire mass was shaken vigorously. Thus, substantially all of the polyarylene ester precipitated as a homogeneous particulate solid. Furthermore, 10 ml of water was added with stirring over a period of about 1 minute, and the stirring was continued for about 10 minutes. The solid was separated by filtration to afford a particulate solid having a high bulk density and a uniform particle size. The resulting polyarylene ester had a logarithmic viscosity of 0.61.

EXAMPLE 7

The solid polyarylene ester synthesized in Referential Example 2 was dissolved in tetrahydrofuran to form a 6% solution. To 200 ml of the solution was gradually added 16 ml of water over the course of about 2 minutes with stirring. The solution was seen to become whitishly turbid. At this time, the addition of water and the stirring of the solution were stopped, and the solution was allowed to stand. The solution separated into two layers. The polymer-containing layer at the bottom, on standing for about 80 minutes, began to solidify gradually to an agar-like mass. After standing for about 90 minutes, the stirring was resumed. The agar-like mass was destroyed and a particulate solid dispersed in the solution. To the dispersion was added 22 ml of water over the course of about 2 minutes with stirring. The stirring was continued for about 10 minutes, and the fine solid was separated from the solution by filtration. Substantially all of the polyarylene ester was obtained as fine particles having a high bulk density and a uniform particle size. The resulting polyarylene ester had a logarithmic viscosity of 0.61.

What we claim is:

1. A method for isolating a polyarylene ester from a solution of the polyarylene ester in tetrahydrofuran and/or dioxane which solution is prepared by polycondensing a dihydric phenol compound and an aromatic dicarboxylic acid or its derivative, which comprises adding water to the solvent solution to form a water-containing solution, the weight ratio of water to the solvent solution being from 0.03 to 0.3, subjecting the resulting water-containing solution to an aging treatment, then precipitating substantially all of the polyarylene ester as a particulate solid from the water-containing solution, and separating the precipitated polyarylene ester from the water-containing solution.

2. The method of claim 1 wherein the dihydric phenol compound is represented by the general formula HO-Ar(X—Ar')$_n$—OH wherein Ar and Ar' each represent an arylene group selected from the class consisting of phenylene and naphthylene, X represents a bridging member selected from the class consisting of a direct single bond, a methylene group, an alkylidene group having 2 to 5 carbon atoms, an ether group, a carbonyl group, a sulfite group, a sulfoxide group and a sulfonyl group, and n represents 0 or 1.

3. The process of claim 2 wherein the dihydric phenol compound is 2,2-bis(4-hydroxyphenyl)propane.

4. The method of claim 1 wherein the aromatic dicarboxylic acid or its derivative is a compound selected from the group consisting of aromatic dicarboxylic acids of the general formula HOOC—Ar"—COOH wherein Ar" represents an arylene group selected from the class consisting of o-phenylene, m-phenylene, p-phenylene and naphthylene groups which may be substituted with an alkyl group having 1 to 4 carbon atoms, or with a halogen atom; dichlorides of the aromatic dicarboxylic acids, and diesters of the aromatic dicarboxylic acids.

5. The method of claim 3 wherein the aromatic dicarboxylic acid or its derivative is terephthaloyl dichloride, or isophthaloyl dichloride, or both.

6. The method of claim 1 wherein the concentration of the polyarylene ester in the organic solvent solution is from 3 to 30% by weight.

7. The method of claim 1 wherein the amount of water is at least sufficient to cause whitish turbidity to the organic solvent solution.

8. The method of claim 1 wherein the addition of water is effected with stirring.

9. The method of claim 1 wherein the aging treatment is effected by allowing the water-containing solution to stand with stirring.

10. The method of claim 1 wherein the aging treatment is effected by allowing the water-containing solution to stand without stirring.

* * * * *